United States Patent
Alajoki et al.

(10) Patent No.: US 6,285,875 B1
(45) Date of Patent: Sep. 4, 2001

(54) TRAFFIC MANAGEMENT SYSTEM FOR USE IN MOBILE COMMUNICATIONS NETWORK

(75) Inventors: Ilpo Alajoki; Timo Varsila, both of Espoo (FI)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 08/981,250

(22) PCT Filed: Jun. 28, 1996

(86) PCT No.: PCT/FI96/00384

§ 371 Date: Mar. 30, 1998

§ 102(e) Date: Mar. 30, 1998

(87) PCT Pub. No.: WO97/01941

PCT Pub. Date: Jan. 16, 1997

(30) Foreign Application Priority Data

Jun. 29, 1995 (FI) .......................................... 953225

(51) Int. Cl.[7] .................................................. H04Q 7/20
(52) U.S. Cl. .......................... 455/423; 455/67.1; 455/422
(58) Field of Search .................................. 455/422, 423, 455/424, 425, 432, 435, 436, 453, 456, 67.1, 439, 446

(56) References Cited

U.S. PATENT DOCUMENTS

| | | | |
|---|---|---|---|
| 5,023,900 | * | 6/1991 | Tayloe et al. .......................... 455/424 |
| 5,095,500 | * | 3/1992 | Tayloe et al. .......................... 455/424 |
| 5,285,494 | | 2/1994 | Sprecher et al. . |
| 5,490,204 | * | 2/1996 | Gulledge .............................. 455/423 |
| 5,517,555 | | 5/1996 | Amadon et al. . |
| 5,644,623 | * | 7/1997 | Gulledge .............................. 455/423 |

FOREIGN PATENT DOCUMENTS

| | | |
|---|---|---|
| 0 505 341 A2 | 9/1992 | (EP) . |
| 0 701 382 A1 | 3/1996 | (EP) . |
| 0 708 573 A2 | 4/1996 | (EP) . |
| 93/12606 | 6/1993 | (WO) . |
| 94/00959 | 1/1994 | (WO) . |

* cited by examiner

*Primary Examiner*—Nay Maung
(74) *Attorney, Agent, or Firm*—Nixon & Vanderhye P.C.

(57) ABSTRACT

A traffic management system reads TT files obtained from mobile services switching centers, and processes information included in the records of the files, and on the basis of the information procedures a hierarchical graphic representation on a map display. The highest level represents the operator's entire service area, and the lowest level a cell. On each level, traffic intensity is displayed with grades of color, i.e., the more traffic the stronger the color. The display is updated automatically as the MSC provides the TT data. The system monitors traffic load in the cells. If the traffic load in any of the cells exceeds a preset level, the system automatically transmits a command to the MSC to change the logic size of the cell or add a TRX unit, if such is available.

14 Claims, 5 Drawing Sheets

| NUMBER A | NUMBER B | DATE | BEGIN TIME | END TIME | ROUTE | CELL ID | PULSES | EOS |
|---|---|---|---|---|---|---|---|---|
| 111 | 888 | 5.6.1995 | 8:00 | 8:06 | 1 | 50 | 5 | 0 |
| 115 | 887 | 5.6.1995 | 8:12 | 8:18 | 2 | 52 | 12 | 0 |
| 114 | 886 | 5.6.1995 | 8:15 | | 5 | 57 | 0 | 10 |
| 113 | 889 | 5.6.1995 | 8:07 | 8:21 | 1 | 50 | 12 | 0 |

Fig.2

TRAFFIC MANAGEMENT SYSTEM FOR USE IN MOBILE COMMUNICATIONS NETWORK

The present invention relates to a traffic management system for a cellular mobile communication network in which a mobile services switching center generates a TT (Toll Ticket) record after every call. The record at least contains information on whether the call succeeded or failed, as well as a cell identifier indicating which cell the call is associated with. TT records generated during a specific time interval are combined into a TT file for further processing.

BACKGROUND AND SUMMARY OF THE INVENTION

In the following, the structure of a mobile communication network will be described with a prior art GSM mobile communication network of FIG. 1 as an example. Communication between a Mobile Station (MS) within a cell and the network takes place on the radio path via a Base Transceiver Station (BTS). The base transceiver stations are coupled to a Base Station Controller (BSC), which usually controls several base stations. The location of the MS is known with an accuracy of a so-called Location Area (LA), constituted by a few cells. The mobile station may roam within the location area without updating its location data. Several base station controllers are coupled to a Mobile Services Switching Center (MSC), which carries out the principal switching functions of the mobile communication network. The entirety of cells under control of the MSC is referred to as an MSC area; all calls originating from this area and terminating therein are forwarded via this MSC. In addition, it connects the mobile communication network to external networks and via a so-called gateway MSC to mobile communication networks of other operators.

A mobile communication network also comprises different kinds of databases. A Home Location Register (HLR) permanently stores a subscriber's data regardless of his current location. Subscriber data obtained from the HLR are stored in a Visitor Location Register (VLR) during the subscriber's visit to the VLR area.

In order for the operator to be able to charge the subscriber for calls and services, the traffic management part of the network has a mechanism by means of which a sufficient amount of data will be stored for every service to be charged. The most significant traffic-related charging basis is constituted by calls. In the MSC, a so-called Toll Ticket record is produced for each call as soon as it has ended, containing all the necessary information to calculate the charges for the call. The contents of the record depend on the switching center technique being employed and the operator requirements. The gateway MSC exchanges messages with the HLR in accordance with a MAP/C protocol, and the prior art message exchanging enables including at least the following data in the TT record fields:

(a) at first, identifiers, i.e. the subscriber's IMS number and the identifier of the MSC that generated the record,
(b) secondly, the type of the call, i.e. whether the call is a mobile originating call or a mobile terminating call forwarded by the MSC (this means that the TT record also contains routing information from the switching center to the mobile station),
(c) if the switching center is a gateway MSC, the record contains routing information GMSC-MS,
(d) mobile terminating call re-routing information GMSC-MSC, if the MSC is in another network,
(e) call status, i.e. information on whether the call succeeded or failed. The data of failed calls are only utilized for statistical purposes, and therefore the manufacturer of the switching center does not always include it in the TT information,
(f) date, call begin moment, duration and nature. The last one indicates whether speech, data, a short message etc is in question,
(g) the number of the calling party (in mobile terminating calls) or the number of the called party (in mobile originating calls),
(h) charging, collected by the target operator from the subscriber's operator in cases of roaming,
(i) cell information (Cell ID), indicating the cell of the incoming/outgoing call.

The fields listed above are exemplary only, and the supplier of the switching center may add other fields according to the operator's requirements. The TT records are stored in an I/O apparatus of the MSC as a file which is at predetermined intervals transferred to a charging system for further processing. Typically, the transfer is carried out at intervals of 5 to 15 minutes, which therefore represents the real time delay for the data.

The chart of FIG. 2 illustrates the use of the aforementioned parameters in a TT record. The fields of the record include the numbers of subscribers a and b, date, time of call begin and end, route, cell ID, call charging pulses and an EOS field. The EOS (End of Selection) is a clear code defining the reason why the call did not go through. There may be in use as many as 1000 different codes. Code 0 means that a call succeeded, and a code other than 0 indicates not only a failed call but a reason for it as well.

As the mobile communication network expands and call intensity varies, the network must continuously be modified. Increase in capacity can be provided by adding new TRX units in the cell, and by adding new nodes (MSCs and BSCs) and new cells whereby the transmission routes also change. To carry out the changes, and for operation, maintenance and managing functions the network produces, from several locations, different kind of information; the BSC, for example, collects information from the cells it controls, whereby information on traffic intensity is obtained as a function of time. Information obtained from various sources has to be gathered and processed in a centralized manner. In this respect, a mobile communication network does not differ from other telecommunication networks.

In present-day mobile communication networks, a drawback of traffic management concerns poor real time representativeness. Information on peaks is only available a long time afterwards. Although the information on changes in traffic intensity is available, this is only after a long delay and in an unillustrative numerical form. As a result, traffic capacity in some cells may run out, because dynamic allocation of traffic capacity in real time, or practically in real time, is not possible.

An object of the present invention is a system which makes traffic management easier by providing a visually illustrative representation of traffic intensity and changes therein in practically real time. The system should be possible to couple to an MSC of any manufacturer, without need to change its internal functions.

This object is achieved with a system set forth in claim 1.

The management system is realized so that the TT file which is obtained from the MSCs of the mobile communication network and which contains TT records is read and transferred to be incorporated into a database of the traffic management system. Traffic management software processes information obtained from the records, counts the number of calls carried out in the cells, and produces a hierarchical graphic representation of the information on a map display. The term "hierarchical" here means that the highest level is the entire geographical area, with possibly several MSCs, under control of one operator. The subsequent level may be an area of one MSC, and the subsequent level may be a location area. The lowest level is represented by one cell. Each level shows traffic intensity with grades of color, i.e. the more traffic is present the stronger the color. The display is automatically updated as the MSC provides the TT data.

The management system also contains logic for traffic load monitoring. This logic monitors the traffic load on the network on different levels and in different cells. If the traffic load in an area, within a cell or cells, exceeds a predetermined level, the software automatically transmits a command to the base station controller in question to distribute traffic between the overloaded cell and the neighbouring cells. This can be done by changing the handover criteria by advancing handovers at cell borders from an overloaded cell to a cell with less traffic load, and correspondingly delaying handover to an overloaded cell. The above can be referred to as logically reducing the size of an overloaded cell. If at the base station there is an additional so-called floating TRX unit available, it can be coupled for use in the overloaded cell and accordingly increase the cell capacity.

The calculation results can be stored for statistical purposes. The statistical data may constitute for example congestion statistics, average duration of calls per channel, degree of channel utilization, etc.

BRIEF DESCRIPTION OF THE SEVERAL VIEWS OF THE DRAWINGS

In the following, the invention will be described in greater detail with reference to the attached drawings, in which FIG. 2 illustrates fields of a TT record.

DETAILED DESCRIPTION OF CERTAIN EMBODIMENTS OF THE INVENTION

Figure 1:
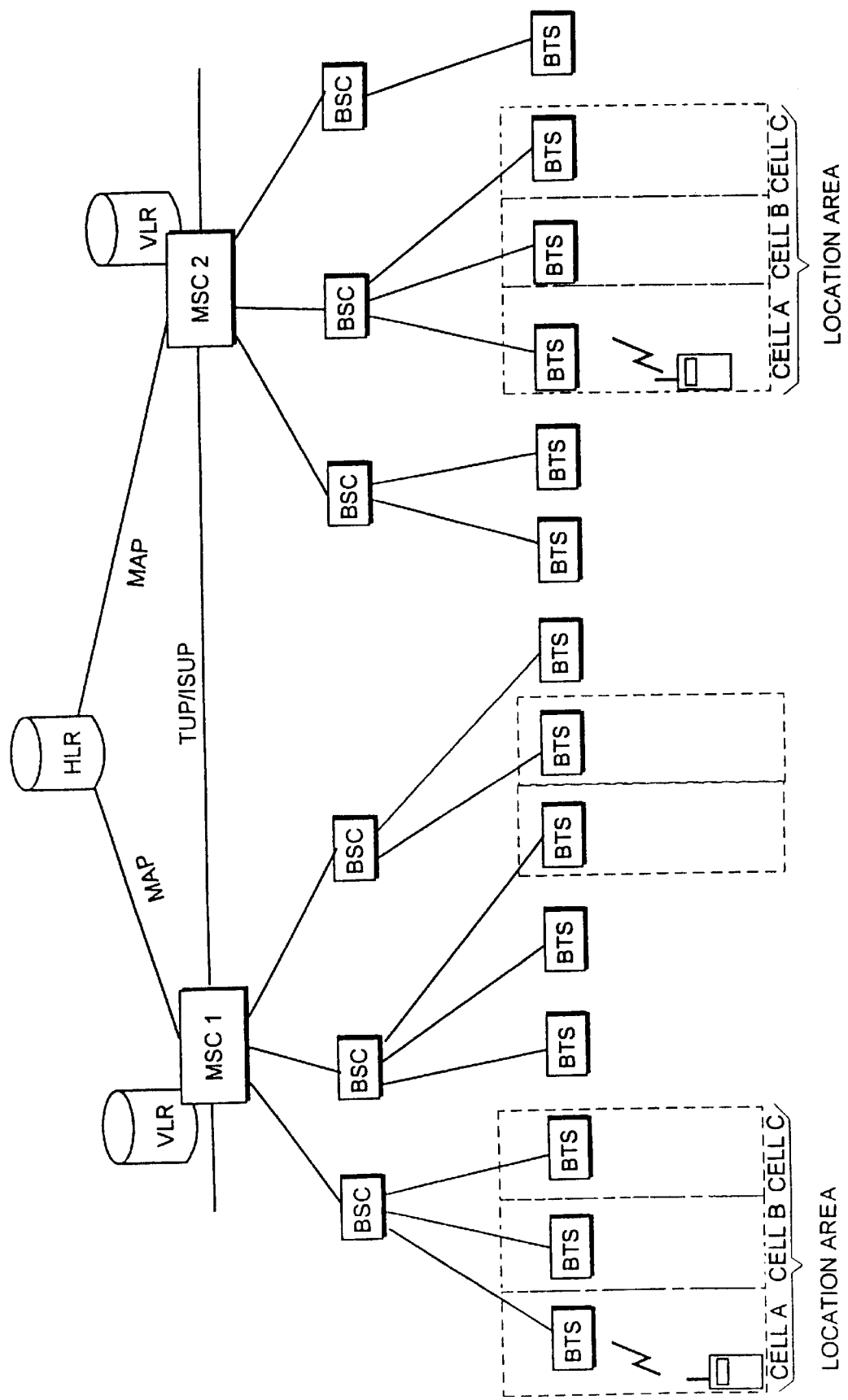
FIG. 1 illustrates the structure of the prior art GSM mobile communication network.
Figure 3:
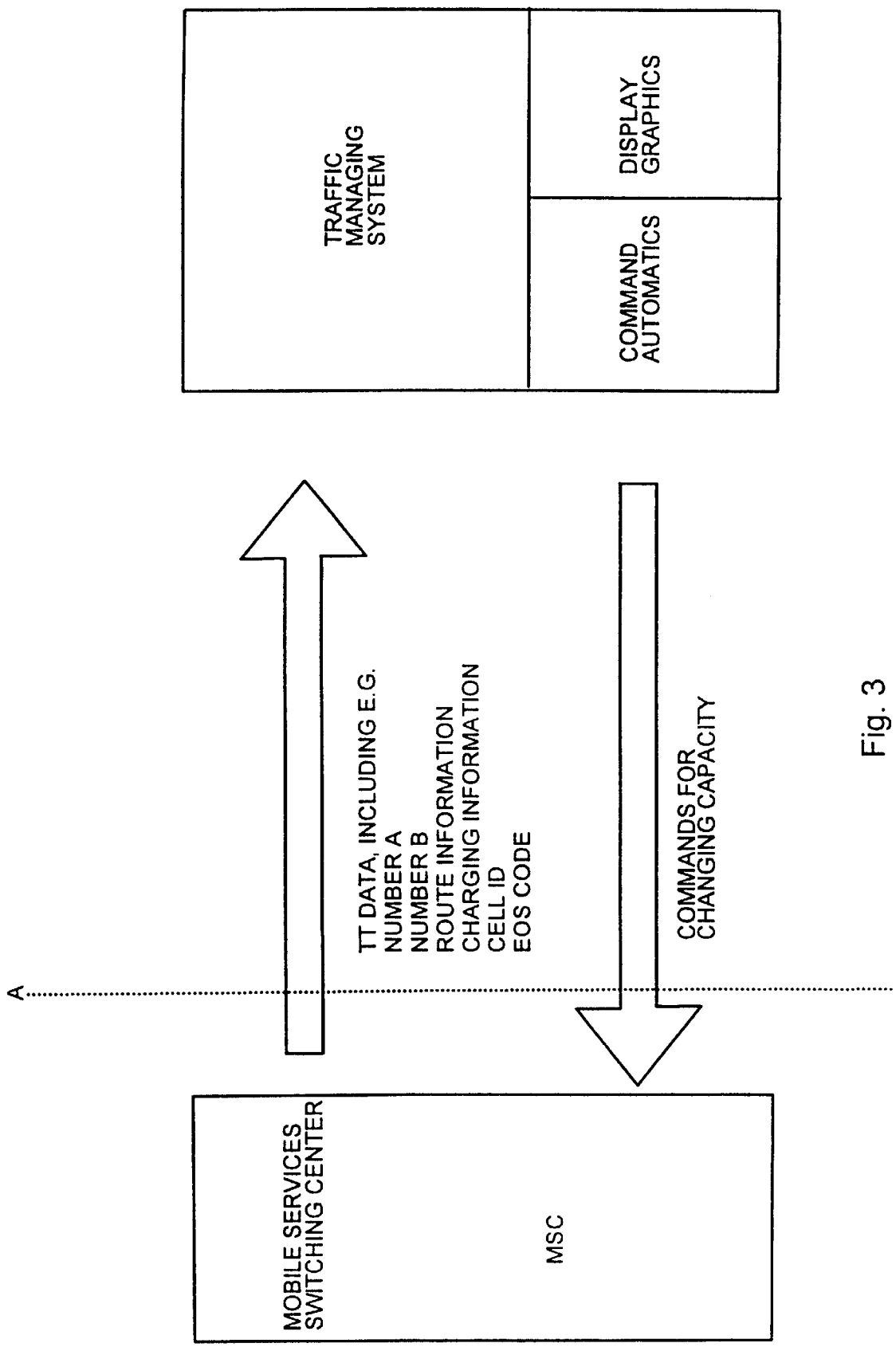
FIG. 3 illustrates coupling of the traffic management system to the mobile communication network.

FIG. 3 shows a mobile communication network in its entirety to the left of the broken line A. The mobile communication network may have several MSCs, one being illustrated in the figure. At precise intervals all present-day MSCs generate for the operator a TT file which, out of fields of FIG. 2, at least contains all other fields but the EOS field concerning possibly failed channel requests. If the switching center nevertheless generates such a field, but for a reason or another does not include it in the TT record, the field will be directed separately to the traffic management system of the invention as well. If the switching center does not generate such a field at all, relevant measures must be taken in the center to generate the field.

The right-hand side of the interface A shows the traffic management system of the invention. It is supplied with the TT file obtained from the MSC: of the TT fields, at least the number A, number B, route information, charging data, i.e. begin and end time and pulses of the call, cell ID and the congested calls data EOS are utilized. The MSC generates a new TT file at predetermined intervals, a typical sequence being 5 to 15 minutes.

The file received by the traffic management system is transferred to be processed by the system. The system distinguishes the records and processes them. Upon using traffic intensity application, the cell ID fields will be summed to their own database. As the TT record also contains, for each call, the identifier of the cell from which the call was placed, or where it terminates, the sum of records having the same cell ID, calculated from the received TT file, represents the number of calls in this cell. If the MSC generates a new TT record for example every 10 minutes, the aforementioned sum denotes the number of calls in the cell during the past 10 minutes. In this manner, the number of calls can be established quickly for each cell of the network. The traffic intensity within a location area can easily be calculated by summing up the number of calls in the cells (under control of the same BSC) of the location area. Correspondingly, the traffic intensity for the MSC area will be obtained by summing up the number of calls in the location areas. Thus, traffic intensity can be calculated with an accuracy of a cell, location area, MSC area and the area of the entire mobile communication network.

On a display unit, traffic intensity is represented in a graphic form so that the map display shows the operator's entire area of operation, for example Finland. Because it is known where an MSC area, location area and a cell having a specific identifier are located on the map, a hierarchical representation of traffic intensity can easily be produced. On the highest level, traffic intensity can be displayed in the entire network area or by MSC area. By clicking the mouse at a desired MSC area, the resolution of the map display increases and the display shows traffic intensity by location area. By clicking the mouse once more, the map display shows the traffic intensity of the location area by cell, and finally the lowest level displays the intensity in a cell. On each level, it is possible to display alpha-numeric information concerning the level.

Traffic intensity may be displayed with grades of color: on a cell level, a call is denoted by a pixel, for example by a red color. As a result, the higher the number of calls carried out in the cell the redder the cell appears. Correspondingly on the other levels, the grade of the red colour on the geographical area indicates traffic intensity in the area. As the traffic management software always updates the display upon receiving a new TT file from the MSC, a clear picture is provided of changes in traffic intensity.

The results of the processing carried out after reception of previous TT files are stored in a memory, which means that by displaying a desired number of calculation results in succession, the map display very clearly shows the changes in traffic intensity. For example, the map display may show how a specific red area moves along roads according to vehicular intensity. The flow chart of the graphic illustration described above represents a direct sequence of the different functions: the data are read, values required are calculated and shown on the map display. Regardless of the high number of different records, the calculation process is very fast. A person skilled in the art will realize that information obtained from the TT file can, in addition to calculating traffic intensity, be also used for various statistical purposes. These include for example congestion statistics, average duration of calls per channel in a cell, degree of channel utilization, proportion of internal calls in the mobile communication network to all calls, proportion of calls coming in to the mobile communication network and calls originating from the mobile communication network to all calls, etc.

The graphic map display of call traffic intensity is one of the features in the system according to the invention. Another characteristic feature is provided by the possibility to monitor, by means of the logic built in the system, the traffic load in the radio network and to automatically optimize the network capacity with commands generated by the system. If a cell is overloaded, or the upper limit of the capacity approaches, the system automatically transmits a command to the MSC e.g. to lower the handover criteria by changing the logic size of the cell in question and/or to take in use in the cell an additional transceiver unit TRX if such is available.

Figure 4:
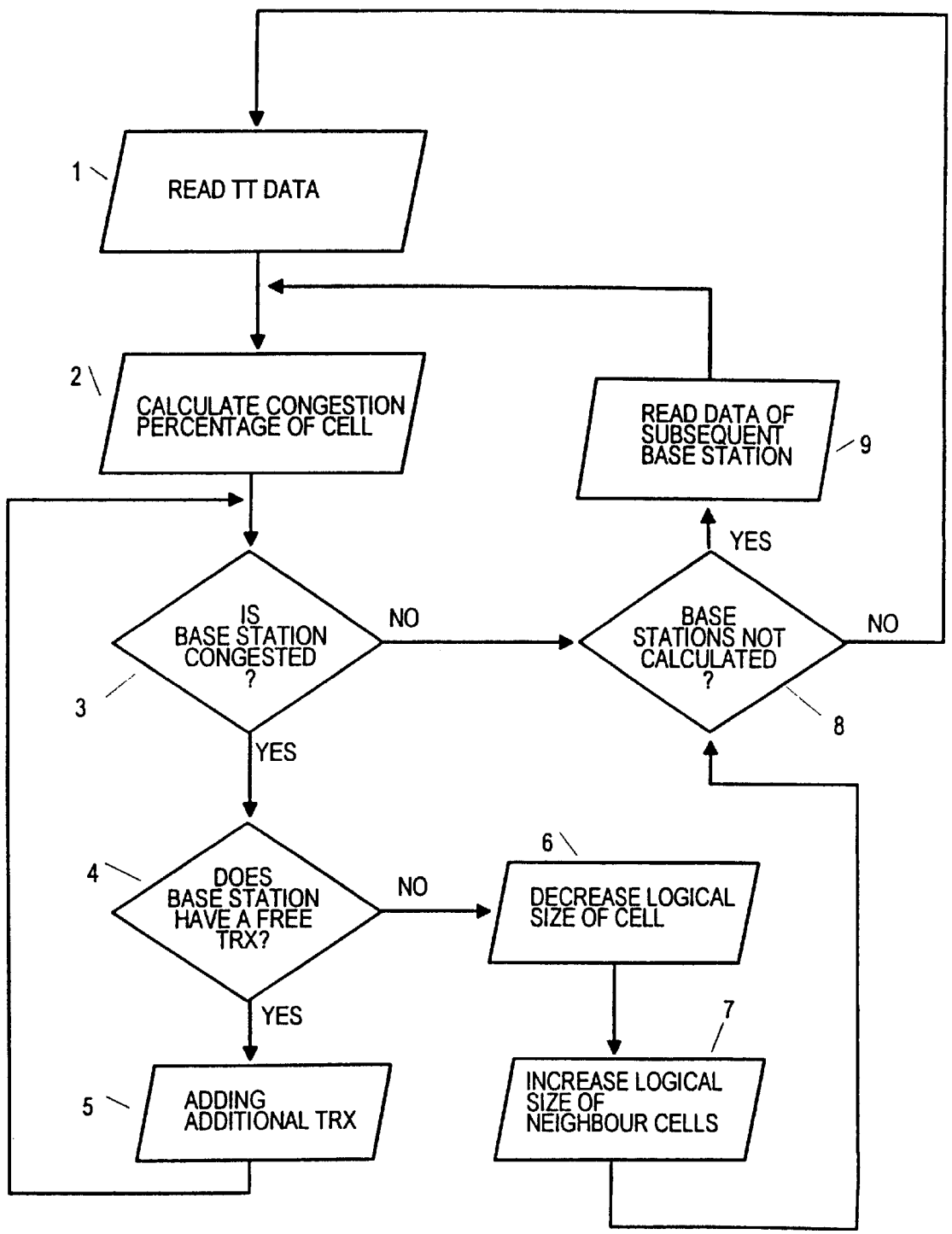
FIG. 4 illustrates a possible flow chart for command automatics.

FIG. 4 shows how to implement the invention in a simple and fast manner. At first, the TT data required are read (block 1). Congestion displace and command automatics are carried out by means of EOS fields indicating failed and succeeded. calls, and cell ID fields. At block 2, congestion percentage E is calculated by the formula:

$$E = \text{(failed channel requests in a specific cell/all channel requests in the cell)} * 100\%.$$

For each cell, the congestion percentage is calculated every time the system receives a new TT file from the MSC. When the congestion percentage E of a cell exceeds a preset value (block 3), the system automatically transmits a command to the MSC to adjust the logic size of the cell, i.e. to change the handover criteria of the cell (block 6) and to enlarge the neighbouring cells, i.e. to change their handover criteria (block 7), or to add an additional TRX in the cell (block 5). The MSC commands the BSC controlling the cell to carry out the procedures required.

This system that processes large quantities of data can be implemented by using an efficient program code with a PC-based apparatus; thus, a Unix work station, for example, will not be required unlike in prior art traffic management systems of fixed networks. The system can be coupled to an MSC of any manufacturer.

Figure 5:
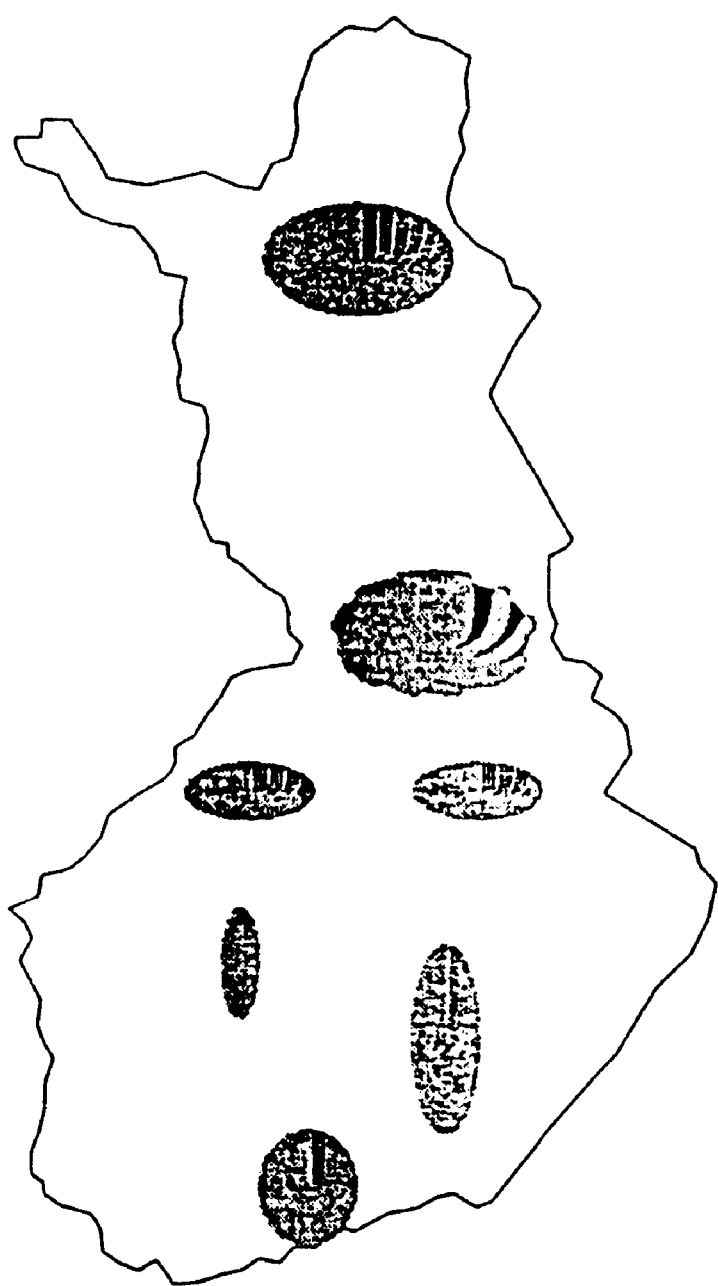
FIG. 5 shows network traffic load on a map display.

Finally, FIG. 5 shows a graphic map display illustration. The figure shows the highest level of an operator's mobile communication network, the entire Finland. The dark areas indicate very high traffic intensity.

It should be understood that the description above and the figures related thereto are only intended to illustrate the present invention. It will be clear to a person skilled in the art that variations and modifications may be incorporated without departing from the scope and spirit of the present invention. The invention has been described in association with one mobile communication network, but it is obvious that in a mobile communication system comprising several MSCs the apparatus may be installed in one of them, and information from the other switching centers and commands to the switching centers can be transmitted by using an appropriate connection, such as an X.25 network.

What is claimed is:

1. A call traffic management system for a cellular mobile communication network, in which a Mobile Services Switching Center generates, after each call, a TT record (Toll Ticket) at least containing information whether the call succeeded or failed and a cell identifier indicating which cell the call is associated with, and combines TT records produced over a specific time interval into a TT file, whereby at said intervals a new TT file will be generated for further processing, characterized in that the management system
is connected to the MSC for reading the TT file and for transferring TT file to the management system as soon as the file has been produced, and for giving commands to the switching center,
contains counting means for counting the number of calls made in each cell of the network,
comprises a graphic user interface by means of which a hierarchical representation of the number of calls can be shown in which the highest level depicts the operator's entire mobile communication network, and the lowest level depicts a cell.

2. A management system as claimed in claim 1, characterized in that the management system comprises means for automatically giving a command concerning the capacity of the cell to the MSC when load in any cell exceeds a preset value.

3. A management system as claimed in claim 1, characterized in that the counting means distinguish a cell identifier field in every record of the TT file, and calculate for each cell the sum of cell identifiers, and that the sum represents the number of calls carried out in the cell.

4. A management system as claimed in claim 1, characterized in that the hierarchical graphic representation comprises, as a basis, a geographical map in different scales, and the number of calls in a specific area is shown with grades of color so that as the number of calls in the area increases the color intensifies.

5. A management system as claimed in claim 1, characterized in that the user may select on the display any level of the group of levels, comprising the entire network, MSC areas, location areas and cells.

6. A management system as claimed in claim 2, characterized in that the means for giving commands concerning the cell capacity comprise
congestion calculation means that calculate, for each cell, the ratio of failed channel requests to all channel requests,
comparison means for comparing said ratio to a preset threshold value,
means for giving the command as the ratio exceeds the threshold value.

7. A management system as claimed in claim 2, characterized in that the command includes a request to increase the cell capacity by changing handover criteria.

8. A management system as claimed in claim 2, characterized in that the command includes a request to add an additional transceiver unit TRX for use in the cell.

9. A management system as claimed in claim 1, characterized in that it utilizes information obtained from the TT file for calculating various kinds of statistics.

10. A method for managing call traffic in a mobile communication network comprising one or more mobile services switching centers MSC, base stations and their controllers which communicate with the MSCs, mobile subscribers communicating with the base stations for transmitting and receiving information, the method comprising the steps of
generating, at predetermined intervals, from the MSCs for the operator, a TT file which comprises at least fields that contain at least a number A, number B, route information, charging data, such as begin and end time and pulses of the call, cell ID and a congested calls data,
transferring predetermined fields to the traffic management system for further processing,
summing the cell ID fields of each cell in a database to represent the number of calls in the cell in question during a specific time interval,
displaying the number of calls as a hierarchical representation in which the highest level depicts the operator's entire mobile communication network, and the lowest level depicts a cell.

11. A method as claimed in claim 10, characterized further by giving a command concerning the capacity of the cell automatically to the MSC when the load in any cell exceeds a preset value.

12. A method as claimed in claim 10, characterized in that traffic intensity is represented on a display unit in a graphic form so that a map display shows the operator's entire area of operation.

13. A method as claimed in claim 10, characterized by displaying a hierarchical representation of traffic intensity in a cell, location area or MSC area, or several MSC areas.

14. A method of managing call traffic in a mobile communications network, the method comprising the steps of:
   generating at intervals, for an operator, at least one TT (toll ticket) file which includes at least one number, a cell identification, and indicates whether a call has succeeded or failed;
   determining a number of calls in a cell; and
   displaying a heirarchical representation of the number calls can be shown in which the highest level depicts the operator's entire mobile communication network, and a lower level depicts a cell.

* * * * *